N. REIF.
PROCESS FOR THE MANUFACTURE OF RUBBER SUBSTITUTE.
APPLICATION FILED MAR. 20, 1909.
1,006,274.
Patented Oct. 17, 1911.
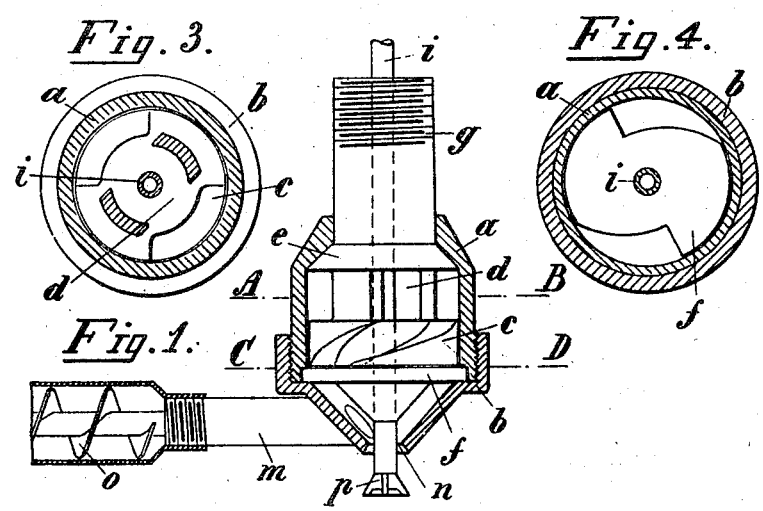
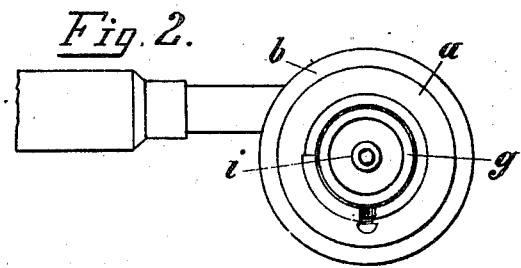
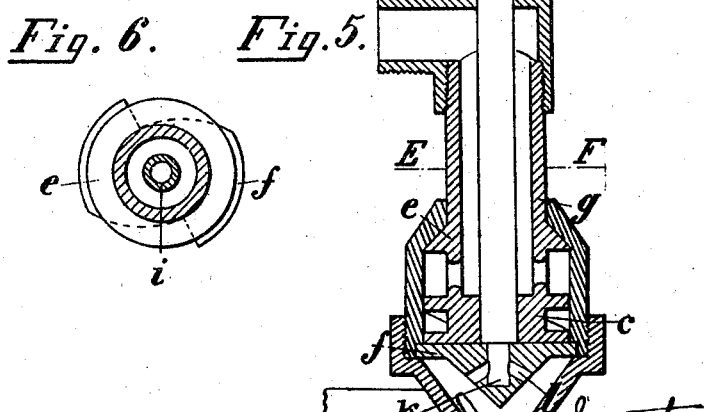

UNITED STATES PATENT OFFICE.

NICOLAUS REIF, OF HANOVER, GERMANY.

PROCESS FOR THE MANUFACTURE OF RUBBER SUBSTITUTE.

1,006,274.      Specification of Letters Patent.     Patented Oct. 17, 1911.

Application filed March 20, 1909. Serial No. 484,733.

*To all whom it may concern:*

Be it known that I, NICOLAUS REIF, a subject of the Emperor of Germany, and resident of Hanover, Germany, have invented certain new and useful Improvements in Processes for the Manufacture of Rubber Substitute, of which the following is a specification.

This invention relates to the manufacture of chemical products and has for its chief object to combine substances capable of readily reacting to form solid bodies in continuously measured quantities, and in such a manner that the final product is obtained directly in a granulated, powdered, flaked or similar condition.

According to this invention the substances are supplied to a mixing apparatus for the purpose of obtaining a chemical reaction the said substances issuing from the apparatus with a rotary movement and reacting during the said movement to become converted into fine grains, powder or flakes. By means of this process, costly disintegrating operations, poisonous effects and loss of material are avoided, while the products obtained are more uniform, as hereinafter demonstrated by way of example in connection with the manufacture of linseed oil india rubber.

In order that the said invention may be clearly understood and readily carried into effect the same will be described more fully with reference to the accompanying drawings in which:

Figure 1 is an elevation partly in section, and Fig. 2 is a plan of one convenient form of apparatus. Fig. 3 is a horizontal section on the line A—B and Fig. 4 is a horizontal section on the line C—D of Fig. 1. Fig. 5 is a sectional elevation of a modified construction and Fig. 6 is a section on the line E—F of Fig. 5.

Linseed oil india rubber is at present produced in a very dangerous manner by mixing oil with sulfur monochlorid, the product being in the form of large lumps which are ground and washed with alkaline solutions for the purpose of neutralizing.

Linseed oil india rubber is obtained in the following manner by the present process. Sulfur monochlorid enters the mouthpiece *b* of the apparatus through the pipe *i* and the passage *l* formed in the cover plate *f* (Fig. 5). Simultaneously oil under high pressure in measured quantities enters the worm *c* through the pipe *g*, mingles in the mouthpiece *b* with the sulfur monochlorid and during the reaction leaves the outlet *n* with a rotary movement, thereby becoming pulverized and precipitated as linseed oil india rubber in the form of flakes. Through the pipe *m* (Fig. 1) an alkaline washing liquid cooled to a very low temperature is simultaneously conducted to the rotating mass so that owing to the cooling the formation of hydrochloric acid is minimized and any acid which may be produced is neutralized. As this operation takes place automatically, and can be carried into practice in hermetically closed apparatus, the present process eliminates all the difficulties and disadvantages of the known methods of manufacturing linseed oil india rubber.

In order to regulate the quantity of liquid conducted through the pipe *g*, without producing a reduction of the pressure in the casing *a*, the cover plate *f* is clamped in position between the casing *a* and the mouthpiece *b*. If the worm *c*, which is rotatable with the pipe *g*, is obturated by the cover plate *f* either wholly or partially, the quantity of liquid passing can be regulated within wide limits without altering the working pressure. With the worm *c* fully open and the pipe *g* rotating quickly the apparatus can also be effectively and automatically cleaned.

If in the construction illustrated in Fig. 5 the passages *l* be omitted and the point of the cover plate be drilled through at *k*, the substance which enters through the pipe *i* passes through the outlet *n* in a smooth jet and is there seized by the rotating liquid issuing from the worm *c* and granulated with it, this affording adequate mixing in certain cases.

Claims:

1. The process of manufacturing chemical products consisting of mixing the components of the product in a suitable mixing apparatus, causing the said components thus mixed to emerge from the mixing apparatus with a rotary movement and causing said components to react during the said rotary movement; and simultaneously therewith subjecting the same to a conditioning element.

2. The process of manufacturing chemical products, which consists in mixing the components of the product in a suitable mixing apparatus, expressing the mixed components from said mixing apparatus with a rotary movement, causing the components to react during the said rotary movement, and simultaneously therewith subjecting the same to a conditioning element, and reducing the mixture to flake like condition.

3. The process of manufacturing chemical products consisting of mixing the components of the product in a suitable mixing apparatus, expressing the mixed components from said mixing apparatus with a rotary movement, and simultaneously therewith subjecting the same to a neutralizing element and reducing the mixture to flake like condition.

4. The process of manufacturing rubber substitute consisting of mixing the components of the product in a suitable mixing apparatus, expressing the mixed components from said mixing apparatus with a rotary movement and in tubular form and causing the same to react, and simultaneously therewith subjecting the same to a finely divided neutralizing substance to reduce the mixture to flake-like condition.

5. The process for the manufacture of rubber substitute consisting in mixing sulfur mono-chlorid with oil under high pressure in a suitable mixing apparatus, causing said elements thus mixed to escape with a rotary movement and causing the same to react, and simultaneously therewith subjecting the same to a finely divided neutralizing substance during the reaction.

6. The process for the manufacture of linseed oil india rubber consisting in mixing sulfur mono-chlorid with oil under high pressure in a suitable mixing apparatus, causing said elements thus mixed to escape with a rotary movement and causing the same to react, and finally subjecting the same to a neutralizing agent consisting of an alkali to reduce the mixture to flake-like condition.

The foregoing specification signed at Hanover, Germany, this eighth day of February, 1909.

NICOLAUS REIF.

In presence of—
GUSTAV DEHARDI,
OTTO FAUSTMANN.